US012571340B2

(12) United States Patent
Yamagata et al.

(10) Patent No.: US 12,571,340 B2
(45) Date of Patent: Mar. 10, 2026

(54) EXHAUST SYSTEM

(71) Applicant: Mazda Motor Corporation, Hiroshima (JP)

(72) Inventors: Naoyuki Yamagata, Aki-gun (JP); Takamasa Matsumoto, Aki-gun (JP); Hiroki Miyawaki, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 19/038,732

(22) Filed: Jan. 28, 2025

(65) Prior Publication Data

US 2025/0305439 A1 Oct. 2, 2025

(30) Foreign Application Priority Data

Mar. 26, 2024 (JP) ................................ 2024-049947

(51) Int. Cl.
*F02B 37/18* (2006.01)
*F01L 1/24* (2006.01)
*F01N 3/10* (2006.01)
*F01N 3/28* (2006.01)

(52) U.S. Cl.
CPC .............. *F02B 37/183* (2013.01); *F01L 1/24* (2013.01); *F01N 3/105* (2013.01); *F01N 3/2892* (2013.01)

(58) Field of Classification Search
CPC ......... F02B 37/183; F02B 37/025; F01L 1/24; F01N 3/105; F01N 3/2892
See application file for complete search history.

(56) References Cited

U.S. PATENT DOCUMENTS 4,467,602 A * 8/1984 Iizuka ................ F02D 41/1443 60/276
6,415,601 B1 * 7/2002 Glugla ................. F01N 3/2006 60/284
7,549,283 B2 * 6/2009 Kerns ................ F01N 13/0093 60/276
2014/0109553 A1 * 4/2014 Roberts, Jr. ......... F01N 13/0093 60/274

FOREIGN PATENT DOCUMENTS

| | | | | | |
|---|---|---|---|---|---|
| DE | 4344277 A1 | * | 6/1995 | ............ | F01N 13/10 |
| JP | H0828253 A | * | 1/1996 | ............ | F01N 3/222 |
| JP | 2005-113803 A | | 4/2005 | | |
| JP | 2007154796 A | * | 6/2007 | | |
| JP | 2008095534 A | * | 4/2008 | | |

* cited by examiner

*Primary Examiner* — Ngoc T Nguyen
(74) *Attorney, Agent, or Firm* — XSENSUS LLP

(57) ABSTRACT

An exhaust passage includes a first exhaust passage which is opened and closed by a first exhaust valve, a second exhaust passage through which exhaust gas is caused to flow independently from the first exhaust passage and which is opened and closed by a second exhaust valve, and a third exhaust passage in which the first exhaust passage and the second exhaust passage merge together, and exhaust catalysts include a main exhaust catalyst which is provided in the third exhaust passage and an auxiliary exhaust catalyst which is arranged in the first exhaust passage and has a smaller capacity than the main exhaust catalyst.

18 Claims, 9 Drawing Sheets

EXHAUST SYSTEM

CROSS-REFERENCE TO RELATED APPLICATION

This application claims priority under 35 U.S.C. § 119(a) to Japanese Application No. 2024-049947, filed in Japan on Mar. 26, 2024, the entire contents of which is hereby incorporated by reference into the present application.

TECHNICAL FIELD

The technique disclosed herein belongs to a technical field about an exhaust system.

BACKGROUND ART

In related art, an exhaust system has been known in which a plurality of exhaust catalysts are arranged in an exhaust passage.

Patent Literature 1 discloses an exhaust gas purification apparatus for an internal combustion engine, in which a first catalyst (auxiliary exhaust catalyst) having an oxidation function is arranged in an exhaust passage which starts from an exhaust manifold collection portion and reaches an exhaust turbine of an exhaust turbocharger and a second catalyst (auxiliary exhaust catalyst) which has a larger capacity than that of the first catalyst is arranged in the exhaust passage in a downstream position relative to the exhaust turbine.

CITATION LIST

Patent Literature

[Patent Literature 1] Japanese Patent Laid-Open No. 2005-113803

SUMMARY OF INVENTION

Problems to be Solved by the Invention

However, in the exhaust system disclosed in Patent Literature 1, exhaust gas necessarily passes through the auxiliary exhaust catalyst before flowing into the main exhaust catalyst. Thus, when an operation region of the engine is an operation region in which a flow amount of the exhaust gas is large, a large amount of exhaust gas passes through the auxiliary exhaust catalyst, and the auxiliary exhaust catalyst might thereby be subject to thermal degradation.

The technique disclosed herein has been made in consideration of such a point, and an object thereof is to inhibit thermal degradation of an auxiliary exhaust catalyst when the auxiliary exhaust catalyst is provided on an upstream side relative to a main exhaust catalyst.

Means for Solving the Problems

For solving the above problems, a first aspect of the technique disclosed herein targets an exhaust system. An exhaust system includes: an exhaust passage through which exhaust gas flows; a first exhaust valve and a second exhaust valve, each of which opens and closes a portion between a combustion chamber of an engine and the exhaust passage; and a plurality of exhaust catalysts which are provided in the exhaust passage and purify the exhaust gas, the exhaust passage includes a first exhaust passage which is opened and closed by the first exhaust valve, a second exhaust passage through which the exhaust gas is caused to flow independently from the first exhaust passage and which is opened and closed by the second exhaust valve, and a third exhaust passage in which the first exhaust passage and the second exhaust passage merge together, and the exhaust catalysts include a main exhaust catalyst which is provided in the third exhaust passage and an auxiliary exhaust catalyst which is arranged in the first exhaust passage and has a smaller capacity than the main exhaust catalyst.

In the first aspect, the exhaust system has the first exhaust passage and the second exhaust passage which can cause the exhaust gas to flow independently from each other, and the auxiliary exhaust catalyst is provided only in the first exhaust passage. Thus, when a flow amount of the exhaust gas is large, the flow amount of the exhaust gas in the first exhaust passage is made smaller than the flow amount of the exhaust gas in the second exhaust passage, and the exhaust system can thereby inhibit a large amount of exhaust gas from passing through the auxiliary exhaust catalyst. The exhaust system can inhibit thermal degradation of the auxiliary exhaust catalyst.

As for a second aspect, in the first aspect, the second exhaust passage has an ejector.

In the second aspect, because the exhaust gas in the second exhaust passage can be caused to flow as early as possible, exhaust interference in the second exhaust passage can be inhibited.

As for a third aspect, in the first aspect, the exhaust system further includes: a flow amount adjustment unit which adjusts a flow amount of the exhaust gas from the second exhaust passage to the third exhaust passage; and a controller which actuates the flow amount adjustment unit, and when an operation state of the engine belongs to a first operation region in which an engine load is smaller than a predetermined load and an engine speed is lower than a predetermined revolution speed, the controller actuates the flow amount adjustment unit so as to stop a flow of the exhaust gas from the second exhaust passage to the third exhaust passage.

In the third aspect, the auxiliary exhaust catalyst can efficiently be warmed up. That is, when the operation state of the engine is in the first operation region, because an exhaust gas amount is comparatively small, the exhaust gas is caused to flow only through the first exhaust passage. Accordingly, the exhaust system can efficiently warm up the auxiliary exhaust catalyst even when the exhaust gas amount is small.

As for a fourth aspect, in the third aspect, when the operation state of the engine belongs to the first operation region and the engine is in a cold state, the controller makes a valve opening time of the first exhaust valve be retarded, compared to a case where the operation state of the engine belongs to the first operation region and the engine is in a warm state, and be later than a timing at which a piston of the engine is positioned at a bottom dead center in an expansion stroke.

In the fourth aspect, because when the engine is in the cold state, the exhaust gas is compressed by a rise of the piston, a temperature of the exhaust gas rises. Because the first exhaust valve is thereafter opened, the exhaust gas at a high temperature flows into the first exhaust passage. Accordingly, the exhaust system can efficiently warm up the auxiliary exhaust catalyst when the engine is in the cold state.

As for a fifth aspect, in the fourth aspect, when the operation state of the engine belongs to the first operation region and the engine is in the warm state, the controller sets a valve opening period of the first exhaust valve to a period which includes the timing at which the piston of the engine is positioned at the bottom dead center in the expansion stroke.

In the fifth aspect, when the engine is in the warm state, the exhaust gas at a temperature, which is as low as possible, can be caused to flow through the first exhaust passage. Accordingly, the exhaust system can inhibit thermal degradation of the auxiliary exhaust catalyst.

As for a sixth aspect, in the first aspect, the exhaust system further includes a controller which actuates the first exhaust valve and the second exhaust valve, and when an operation state of the engine belongs to a second operation region in which the engine load is equal to or greater than a predetermined load and the engine speed is equal to or higher than a predetermined revolution speed, the controller retards a valve opening time of the first exhaust valve relatively to a valve opening time of the second exhaust valve.

In the sixth aspect, the second exhaust valve is opened earlier than the first exhaust valve, the exhaust gas at a comparatively high temperature thereby flows into the second exhaust passage, and the exhaust gas at a comparatively low temperature flows into the first exhaust passage. Accordingly, the exhaust system can inhibit thermal degradation of the auxiliary exhaust catalyst. Further, the exhaust system can efficiently warm up the main exhaust catalyst.

As for a seventh aspect, in the sixth aspect, when the operation state of the engine belongs to the second operation region, the controller makes the valve opening period of the second exhaust valve be longer than the valve opening period of the first exhaust valve.

In the seventh aspect, the exhaust gas is caused to flow into the second exhaust passage as much as possible, and the flow amount of the exhaust gas in the first exhaust passage can thereby be decreased. Accordingly, the exhaust system can inhibit thermal degradation of the auxiliary exhaust catalyst. Further, the exhaust system can efficiently warm up the main exhaust catalyst.

As for an eighth aspect, in the seventh aspect, when the operation state of the engine belongs to the second operation region, the controller causes the second exhaust valve to be opened before a timing at which a piston of the engine is positioned at a bottom dead center in an expansion stroke.

In the eighth aspect, the second exhaust valve is opened in a state where the exhaust gas is more compressed than at the timing at which the piston of the engine is at the bottom dead center. Accordingly, as large amount as possible of the exhaust gas at a comparatively high temperature can be caused to flow into the second exhaust passage. On the other hand, only as small amount as possible of the exhaust gas at a comparatively low temperature can be caused to flow into the first exhaust passage. Accordingly, the exhaust system can inhibit thermal degradation of the auxiliary exhaust catalyst. Further, the exhaust system can efficiently warm up the main exhaust catalyst.

As for a ninth aspect, in any one of the first to eighth aspects, a turbine housing, in which a turbine of a turbocharger is arranged, is arranged in a portion in the third exhaust passage on an upstream side relative to the main exhaust catalyst.

In the ninth aspect, the turbine housing is arranged in the third exhaust passage, and an exhaust system 1 can thereby efficiently transmit exhaust energy to the turbine.

Advantageous Effects of Invention

As described in the foregoing, according to the technique disclosed herein, an exhaust system can inhibit thermal degradation of an auxiliary exhaust catalyst.

MODE FOR CARRYING OUT THE INVENTION

Example embodiments will hereinafter be described in detail with reference to drawings.

(1) GENERAL CONFIGURATION OF ENGINE SYSTEM

Figure 1:
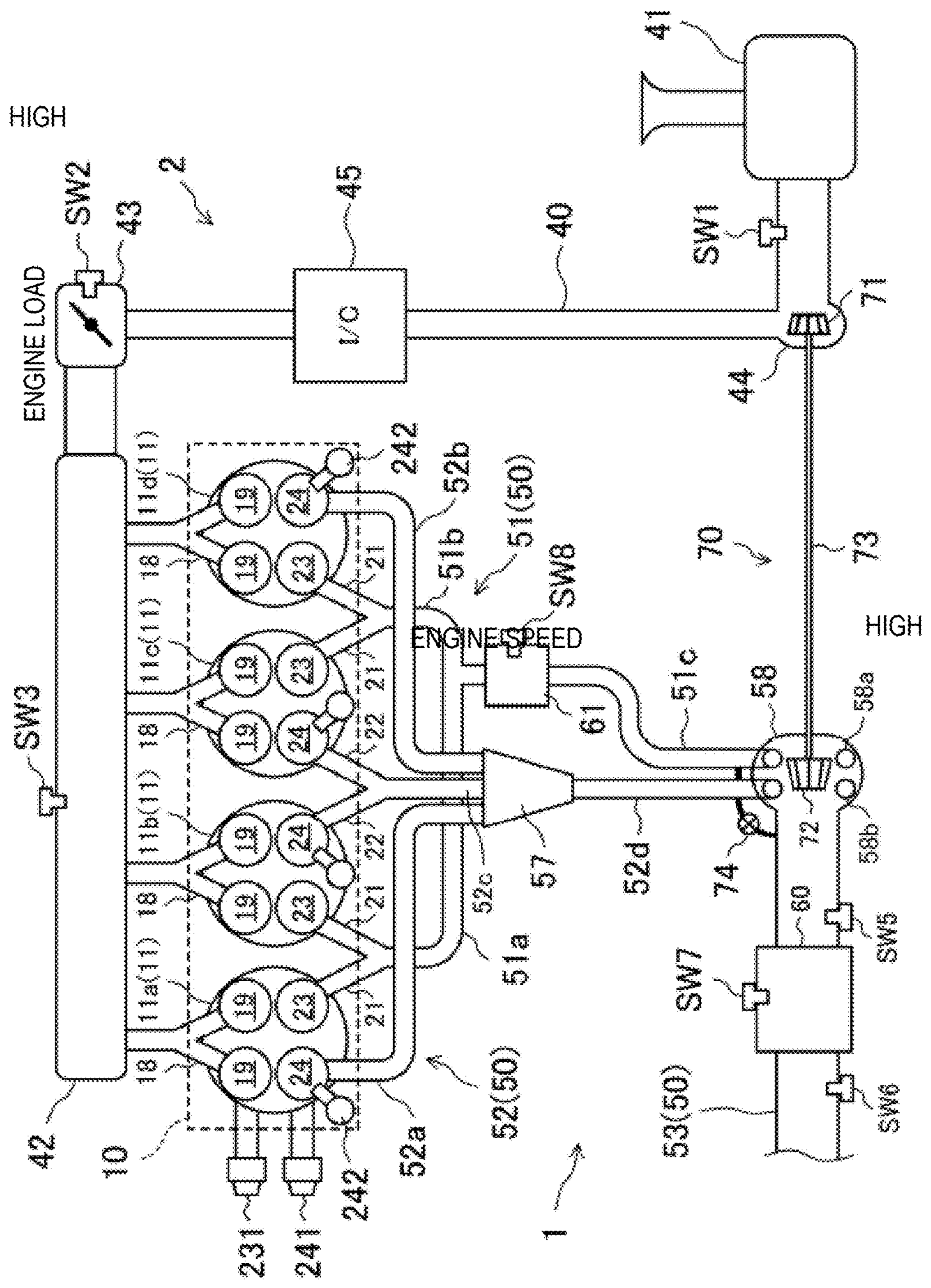
FIG. 1 is an outline diagram illustrating an engine system having an exhaust system according to an example embodiment.

FIG. 1 illustrates an outline of an engine system. The engine system has an engine 10, an intake system 2, an exhaust system 1, and a turbocharger 70.

(1-1) Engine

The engine 10 has cylinders 11. In each of the cylinders 11, an intake stroke, a compression stroke, an expansion stroke, and an exhaust stroke are repeated. The engine 10 is a four-stroke engine. The engine 10 is installed in a four-wheel automobile. The engine 10 operates, and the automobile thereby travels.

Figure 2:
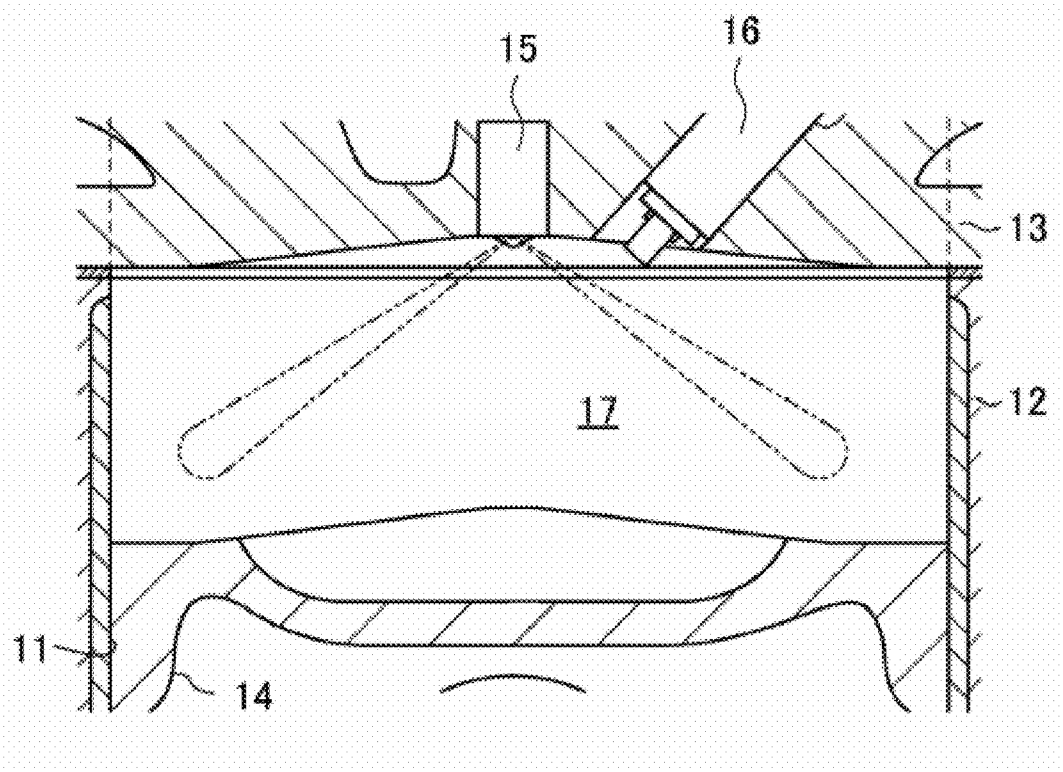
FIG. 2 is a cross-sectional view illustrating a combustion chamber of an engine.

The engine 10 is a multi-cylinder engine having a plurality (four herein) of cylinders. As illustrated in FIG. 2, a cylinder block 12 and a cylinder head 13 are provided. The cylinder head 13 is placed on the cylinder block 12. The cylinders 11 are formed in the cylinder block 12. The four cylinders 11 are aligned in a straight line.

A piston 14 is inserted (housed) in each of the cylinders 11. The piston 14 is coupled with a crankshaft via a connecting rod. The piston 14 reciprocates in an internal portion of the cylinder 11. The piston 14, the cylinder 11, and the cylinder head 13 form a combustion chamber 17.

Injectors 15 which inject fuel into the cylinders 11 are mounted on the engine 10. Each of the injectors 15 directly injects fuel into the cylinder 11. Further, spark plugs 16 which ignite air-fuel mixture containing the fuel injected from the injectors 15 are mounted on the engine 10.

In the four cylinders 11, the expansion stroke is executed in predetermined order. In FIG. 1, when the four cylinders 11 are denoted as a first cylinder 11*a*, a second cylinder 11*b*, a third cylinder 11*c*, and a fourth cylinder 11*d* in order from the left side of the page, in the present embodiment, the expansion stroke is executed in order of the first cylinder 11*a*, the third cylinder 11*c*, the fourth cylinder 11*d*, and the second cylinder 11*b*.

(1-2) Intake System

The intake system 2 introduces intake air into the engine 10. As illustrated in FIG. 1, the intake system has intake ports 18 which are provided in the engine 10 and an intake passage 40 which communicates with the intake ports 18.

The intake port 18 is formed for each of the cylinders 11. The intake port 18 communicates with an interior of the combustion chamber 17.

Figure 3:
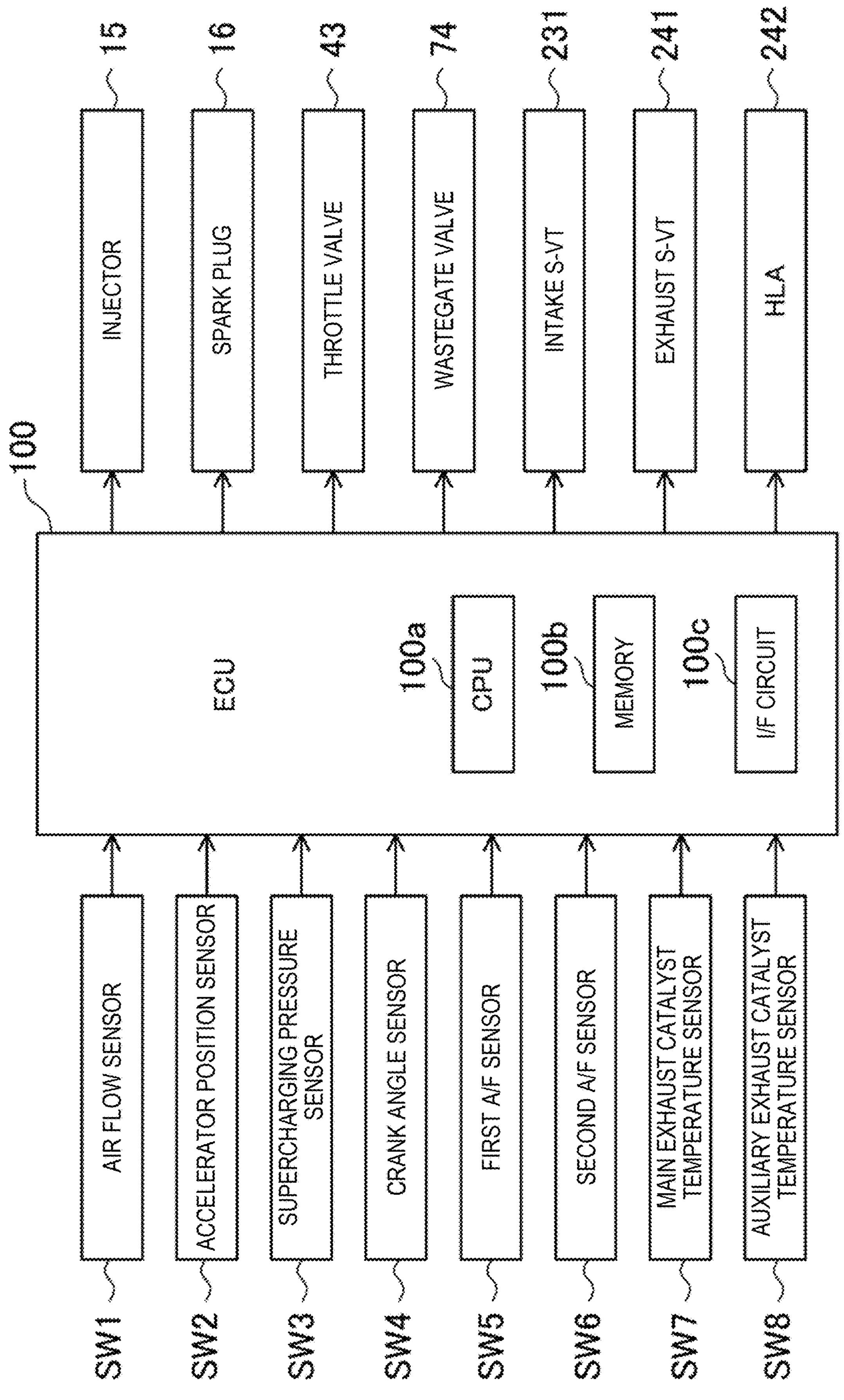
FIG. 3 is a block diagram illustrating a control system of an engine.

An intake valve 19 is disposed in the intake port 18. The intake valve 19 opens and closes the intake port 18. A valve operating apparatus is connected with each of the intake valves 19. The valve operating apparatus opens and closes each of the intake valves 19 at a predetermined timing. The valve operating apparatus is a variable valve operating apparatus which makes at least one of a valve timing and a valve lift be variable. As illustrated in FIG. 3, the valve operating apparatus has an intake S-VT (sequential-valve timing) 231. The intake S-VT 231 is of a hydraulic type or an electric type. The intake S-VT 231 continuously changes a rotation phase of an intake camshaft in a predetermined angle range.

The intake passage 40 communicates with the intake port 18 of each of the cylinders 11. Air to be introduced into the cylinders 11 flows through the intake passage 40. An air cleaner 41 is disposed in an upstream end portion of the intake passage 40. The air cleaner 41 filters air. A surge tank 42 is disposed in the vicinity of a downstream end of the intake passage 40. The intake passage 40 in a downstream position relative to the surge tank 42 configures independent passages which branch for the respective cylinders 11. A downstream end of the independent passage is connected with the intake port 18 of each of the cylinders 11.

A throttle valve 43 is arranged between the air cleaner 41 and the surge tank 42 in the intake passage 40. Between the air cleaner 41 and the throttle valve 43 in the intake passage 40, a compressor housing 44 is provided in which a compressor 71 of the turbocharger 70 is arranged. Between the compressor 71 and the throttle valve 43 in the intake passage 40, an intercooler 45 is arranged which cools supercharged air.

(1-3) Exhaust System

The exhaust system 1 discharges exhaust gas from the combustion chambers 17. The exhaust system 1 has first exhaust ports 21 and second exhaust ports 22 which are provided in the engine 10, an exhaust passage 50 through which exhaust gas exhausted from the first exhaust ports 21 and the second exhaust ports 22 flows, and a main exhaust catalyst 60 which is provided in the exhaust passage 50.

In each of the first exhaust ports 21, a first exhaust valve 23 is disposed. The first exhaust valve 23 opens and closes the first exhaust port 21 and thereby opens and closes a portion between the combustion chamber 17 and the exhaust passage 50. In each of the second exhaust ports 22, a second exhaust valve 24 is disposed. The second exhaust valve 24 opens and closes the second exhaust port 22 and thereby opens and closes a portion between the combustion chamber 17 and the exhaust passage 50. An opening area of the first exhaust port 21 to the combustion chamber 17 and an opening area of the second exhaust port 22 to the combustion chamber 17 have the same size. Thus, the first exhaust valve 23 and the second exhaust valve 24 have the same size.

When a direction in which the four cylinders 11 are aligned is set as a straight-line direction, the first exhaust port 21 of the first cylinder 11*a* and the first exhaust port 21 of the second cylinder 11*b* are adjacent to each other in the straight-line direction. The first exhaust port 21 of the third cylinder 11*c* and the first exhaust port 21 of the fourth cylinder 11*d* are adjacent in the straight-line direction. The second exhaust port 22 of the second cylinder 11*b* and the second exhaust port 22 of the third cylinder 11*c* are adjacent to each other in the straight-line direction.

The valve operating apparatus is connected with each of the first exhaust valves 23 and each of the second exhaust valves 24. The valve operating apparatus opens and closes each of the first exhaust valves 23 and each of the second exhaust valves 24 at predetermined timings. The valve operating apparatus is a variable valve operating apparatus which makes the valve timing and/or the valve lift be variable. As illustrated in FIG. 3, the valve operating apparatus has an exhaust S-VT 241. The exhaust S-VT 241 is of a hydraulic type or an electric type. The exhaust S-VT 241 continuously changes a rotation phase of an exhaust camshaft in a predetermined angle range.

The exhaust system 1 has a hydraulic lash adjuster (HLA) 242 having a valve stopping mechanism which stops an action of the first exhaust valve 23. The HLA 242 is provided for each of the first exhaust valves 23. The valve stopping mechanism of the HLA 242 is actuated when oil pressurized to a predetermined actuation hydraulic pressure is supplied and stops the first exhaust valve 23 of the cylinder 11, which is to be stopped, at a closed state. Because a known configuration (for example, Japanese Patent Laid-Open No. 2023-30763) can be employed for the valve stopping mechanism, a detailed description will not be made. The HLA 242 is one example of a flow amount adjustment unit.

The exhaust passage 50 includes a first exhaust passage 51 which communicates with the first exhaust ports 21, a second exhaust passage 52 which communicates with the second exhaust ports 22, and a third exhaust passage 53 in which the first exhaust passage 51 and the second exhaust passage 52 merge together.

The first exhaust passage 51 has a first joining passage 51*a*, a second joining passage 51*b*, and a first collection passage 51*c*.

The first joining passage 51*a* is a passage in which the first exhaust port 21 of the first cylinder 11*a* and the first exhaust port 21 of the second cylinder 11*b* are joined together. The second joining passage 51*b* is a passage in which the first exhaust port 21 of the third cylinder 11*c* and the first exhaust port 21 of the fourth cylinder 11*d* are joined together. The first collection passage 51*c* is a passage in which the first joining passage 51*a* and the second joining passage 51*b* are joined together.

The exhaust strokes are consecutively performed between the first cylinder 11*a* and the second cylinder 11*b* and between the third cylinder 11*c* and the fourth cylinder 11*d*. Valve opening periods of the first exhaust valves 23 are devised, and exhaust interference is thereby caused not to occur in the first joining passage 51*a* and the second joining passage 51*b*. The valve opening period of the first exhaust valve 23 will be described later.

The first collection passage 51*c* is provided with an auxiliary exhaust catalyst 61. The auxiliary exhaust catalyst 61 is a catalyst which has a smaller capacity than that of the main exhaust catalyst 60. The auxiliary exhaust catalyst 61 is a three-way catalyst.

The second exhaust passage 52 is an exhaust passage which is independent from the first exhaust passage 51. The second exhaust passage 52 is provided with no exhaust catalyst.

The second exhaust passage 52 has a first independent passage 52*a*, a second independent passage 52*b*, a third joining passage 52*c*, and a second collection passage 52*d*.

The first independent passage 52*a* is a passage which extends from the second exhaust port 22 of the first cylinder 11*a*. The second independent passage 52*b* is a passage which extends from the second exhaust port 22 of the fourth cylinder 11*d*. The third joining passage 52*c* is a passage in which the second exhaust port 22 of the second cylinder 11*b* and the second exhaust port 22 of the third cylinder 11*c* are joined together. Because the exhaust strokes are not consecutively performed between the second cylinder 11*b* and the third cylinder 11*c*, the exhaust interference does not occur in the third joining passage 52*c*.

The second collection passage 52*d* is a passage in which the first independent passage 52*a*, the second independent passage 52*b*, and the third joining passage 52*c* are collected. The second collection passage 52*d* extends such that a flow of the exhaust gas flowing through the second collection passage 52*d* is parallel with and in the same direction as a flow of the exhaust gas flowing through the first collection passage 51*c*. Specifically, the second collection passage 52*d* extends in parallel with the first collection passage 51*c*.

An ejector 57 is arranged between the first independent passage 52*a*, second independent passage 52*b*, and third joining passage 52*c* and the second collection passage 52*d*. The ejector 57 has a nozzle portion which has a relatively narrow channel cross-sectional area and a diffuser portion which has a relatively wide channel cross-sectional area. The channel cross-sectional area of the nozzle portion is smaller than that of the second collection passage 52*d*. The channel cross-sectional area of the diffuser portion is approximately the same as that of the second collection passage 52*d*. Downstream side end portions of the first independent passage 52*a*, the second independent passage 52*b*, and the third joining passage 52*c* are connected with the ejector 57 while being aligned such that height positions of the downstream side end portions agree with each other. The exhaust gas, which flows from the first independent passage 52*a*, the second independent passage 52*b*, and the third joining passage 52*c* into the ejector 57, passes through the nozzle portion, thereafter passes through the diffuser portion, and flows into the second collection passage 52*d*. The ejector 57 causes the exhaust gas to smoothly flow to the second collection passage 52*d* and thereby inhibits the exhaust interference among the first independent passage 52*a*, the second independent passage 52*b*, and the third joining passage 52*c*.

The third exhaust passage 53 is a passage in which the first collection passage 51*c* and the second collection passage 52*d* merge together.

Between the first collection passage 51*c* and second collection passage 52*d* and the third exhaust passage 53, a turbine housing 58 is arranged in which a turbine 72 of the turbocharger 70 is arranged. The first collection passage 51*c* and the second collection passage 52*d* are joined together in the turbine housing 58. In other words, the first exhaust passage 51 and the second exhaust passage 52 are joined together in the turbine housing 58.

A wastegate valve 74 is connected between the first collection passage 51*c* of the first exhaust passage 51 and the third exhaust passage 53 and between the second collection passage 52*d* of the second exhaust passage 52 and the third exhaust passage 53. The wastegate valve 74 is a valve which adjusts whether the exhaust gas passing through the first collection passage 51*c* and the second collection passage 52*d* is caused to flow into the turbine housing 58 or to flow to the third exhaust passage 53 while bypassing the turbine housing 58. When the wastegate valve 74 is in the closed state, the exhaust gas flows into the turbine housing 58. When the wastegate valve 74 is in the closed state, the turbine 72 is rotated by the exhaust gas. On the other hand, when the wastegate valve 74 is in an open state, the exhaust gas flows into the third exhaust passage 53 while bypassing the turbine housing 58. When the wastegate valve 74 is in the open state, rotation of the turbine 72 by the exhaust gas is inhibited.

The main exhaust catalyst 60 is arranged in the third exhaust passage 53. The main exhaust catalyst 60 is a three-way catalyst. The exhaust gas passing through the main exhaust catalyst 60 passes through the third exhaust passage 53 and is discharged to the outside of the automobile.

(1-4) Turbocharger

As illustrated in FIG. 1, the turbocharger 70 has the compressor 71, the turbine 72, and a turbine shaft 73 which connects the compressor 71 with the turbine 72. When the turbine 72 is rotated by the exhaust gas, rotation is transmitted to the compressor 71 by the turbine shaft 73, and the compressor 71 is rotated.

As illustrated in FIG. 1, the turbocharger 70 is a twin scroll turbocharger. The turbine housing 58 has a first scroll portion 58*a* and a second scroll portion 58*b*, which are independent from each other. The first scroll portion 58*a* is connected with the first exhaust passage 51, and the second scroll portion is connected with the second exhaust passage 52. The exhaust gas flowing through the first exhaust passage 51 and the exhaust gas flowing through the second exhaust passage 52 are supplied to the turbine 72 independently from each other.

(2) CONFIGURATION OF CONTROL APPARATUS

As illustrated in FIG. 3, a control apparatus of the engine system includes an ECU (engine control unit) 100 for operating the engine 10. The ECU 100 is a controller based on a known microcomputer and includes a central processing unit (CPU) 100*a*, a memory 100*b*, and an I/F circuit 100*c*. The CPU 100*a* executes a program. The memory 100*b* is configured with a RAM (random access memory) or a ROM (read-only memory), for example, and stores programs and data. The I/F circuit 100*c* inputs and outputs electric signals. The ECU 100 is one example of a controller. The ECU 100 is configured also as a controller of the exhaust system 1.

The ECU 100 is electrically connected with the injectors 15 and the spark plugs 16, for example. The ECU 100 controls each of the injectors 15 and the spark plugs 16.

As illustrated in FIG. 1 and FIG. 3, various sensors SW1 to SW8 are connected with the ECU 100. Each of the sensors SW1 to SW8 outputs a signal to the ECU 100. The sensors include the following sensors.

An air flow sensor SW1 which is arranged in a downstream position relative to the air cleaner 41 in the intake passage 40 and measures a flow amount of air flowing through the intake passage 40.

An accelerator position sensor SW2 which is mounted on an accelerator pedal mechanism and measures an accelerator position corresponding to an operation amount of the accelerator pedal.

A supercharging pressure sensor SW3 which is mounted on the surge tank 42 and measures a pressure of air supercharged by the turbocharger 70.

A crank angle sensor SW4 which is mounted on the engine 10 and measures a rotation angle of the crankshaft.

A first A/F sensor SW5 which is arranged in an upstream position relative to the main exhaust catalyst 60 in the third exhaust passage 53 and detects an oxygen concentration in the exhaust gas.

A second A/F sensor SW6 which is arranged in a downstream position relative to the main exhaust catalyst 60 in the third exhaust passage 53 and detects the oxygen concentration in the exhaust gas.

A main exhaust catalyst temperature sensor SW7 which is arranged on the main exhaust catalyst 60 and measures a temperature of the main exhaust catalyst 60.

An auxiliary exhaust catalyst temperature sensor SW8 which is arranged on the auxiliary exhaust catalyst 61 and measures the temperature of the main exhaust catalyst 60.

Based on signals of those sensors SW1 to SW8, the ECU 100 assesses an operation state of the engine 10 and computes a control amount of each device in accordance with control logics which are defined in advance. The control logics are stored in the memory 100*b*. The control logics include computing a target amount and/or the control amount by using a map stored in the memory 100*b*.

The ECU 100 outputs electric signals related to the computed control amounts to the injectors 15, the spark plugs 16, the throttle valve 43, the wastegate valve 74, the intake S-VT 231, the exhaust S-VT 241, and the HLAs 242.

(3) OPERATION CONTROL MAP FOR ENGINE

Figure 4:
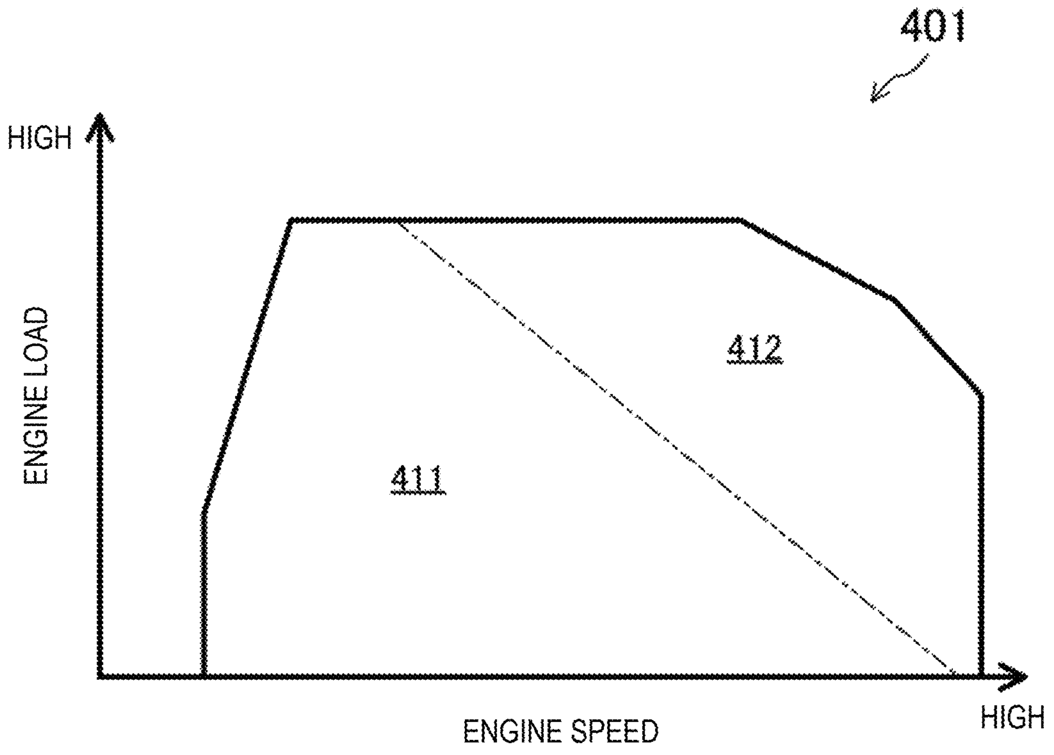
FIG. 4 is a map illustrating a relationship between an operation state of the engine and open-close control of exhaust valves.

FIG. 4 illustrates, as an example, a base map related to control of the engine 10. FIG. 4 illustrates a first base map 401 about control of the first exhaust valves 23 and the second exhaust valves 24.

The first base map 401 is stipulated by an engine load and an engine speed. In rough classification with respect to a level of the engine load and a level of the engine speed, the first base map 401 is divided into two regions of a first operation region 411 and a second operation region 412 in a region with a lower load than a full load line ML. The engine load at a boundary line BL corresponds to a predetermined load, and a revolution speed at the boundary line BL corresponds to a predetermined revolution speed. The boundary line BL is positioned on a lower load side as the engine speed becomes higher.

The first operation region 411 is a region in which the engine load is smaller than the engine load at the boundary line BL and the engine speed is lower than the engine speed at the boundary line BL. In other words, the first operation region 411 is an operation region in which the engine load is smaller than the predetermined load and the engine speed is lower than the predetermined revolution speed.

The second operation region 412 is a region in which the engine load is equal to or greater than the engine load at the boundary line BL and the engine speed is equal to or higher than the engine speed at the boundary line BL. In other words, the second operation region 412 is an operation region in which the engine load is equal to or greater than the predetermined load and the engine speed is equal to or higher than the predetermined revolution speed. The boundary line BL belongs to the second operation region 412.

When the operation state of the engine 10 belongs to the first operation region 411, the ECU 100 stops a flow of the exhaust gas from the second exhaust passage 52 to the third exhaust passage 53. Specifically, the ECU 100 stops open-close actions of the second exhaust valves 24 at the closed state by the HLAs 242. Meanwhile, the ECU 100 causes the first exhaust valves 23 to open and close in accordance with reciprocating actions of the pistons 14. Accordingly, the exhaust gas produced in the cylinders 11 does not flow into the second exhaust passage 52 but flows only into the first exhaust passage 51.

When the operation state of the engine 10 belongs to the first operation region 411, the ECU 100 makes valve opening times of the first exhaust valves 23 be different in accordance with whether the engine 10 is in a cold state or in a warm state. The valve opening time of the first exhaust valve 23 will be described later. Note that the first operation region 411 itself is a region having the same engine load and the same engine speed even when the engine 10 is in the cold state or the warm state.

When the operation state of the engine 10 belongs to the second operation region 412, the ECU 100 causes the exhaust gas to flow from both of the first exhaust passage 51 and the second exhaust passage 52 to the third exhaust passage 53. The ECU 100 makes different the valve opening times of the first exhaust valves 23 and the valve opening times of the second exhaust valves 24. The valve opening time of the first exhaust valve 23 and the valve opening time of the second exhaust valve 24 will be described later. Note that the second operation region 412 itself is a region having the same engine load and the same engine speed even when the engine 10 is in the cold state or the warm state.

(4) OPEN-CLOSE CONTROL OF EXHAUST VALVE

Figure 5:
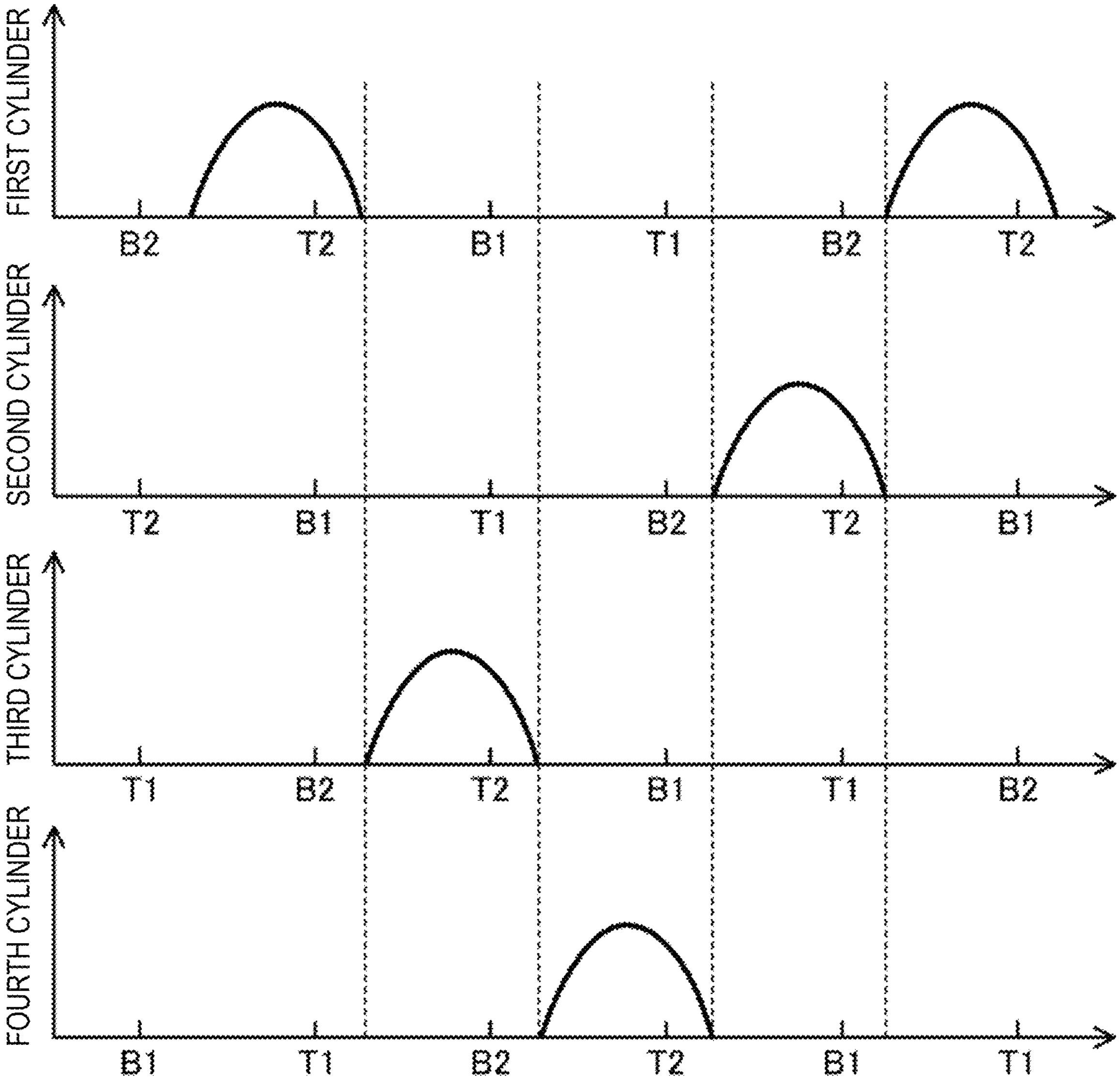
FIG. 5 is a diagram illustrating open-close actions of the exhaust valves in first exhaust valve control.
Figure 6:
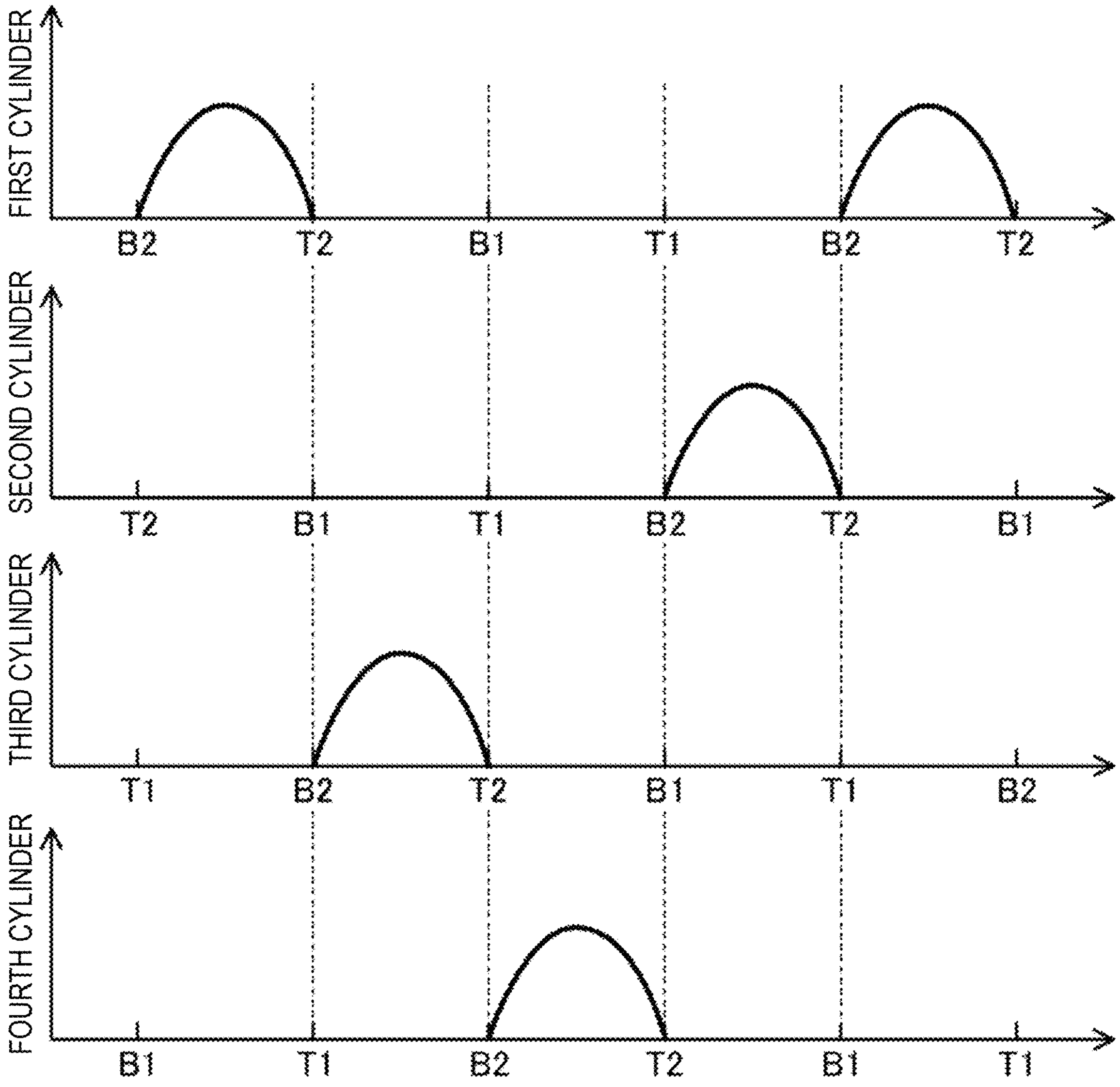
FIG. 6 is a diagram illustrating open-close actions of the exhaust valves in second exhaust valve control.
Figure 7:
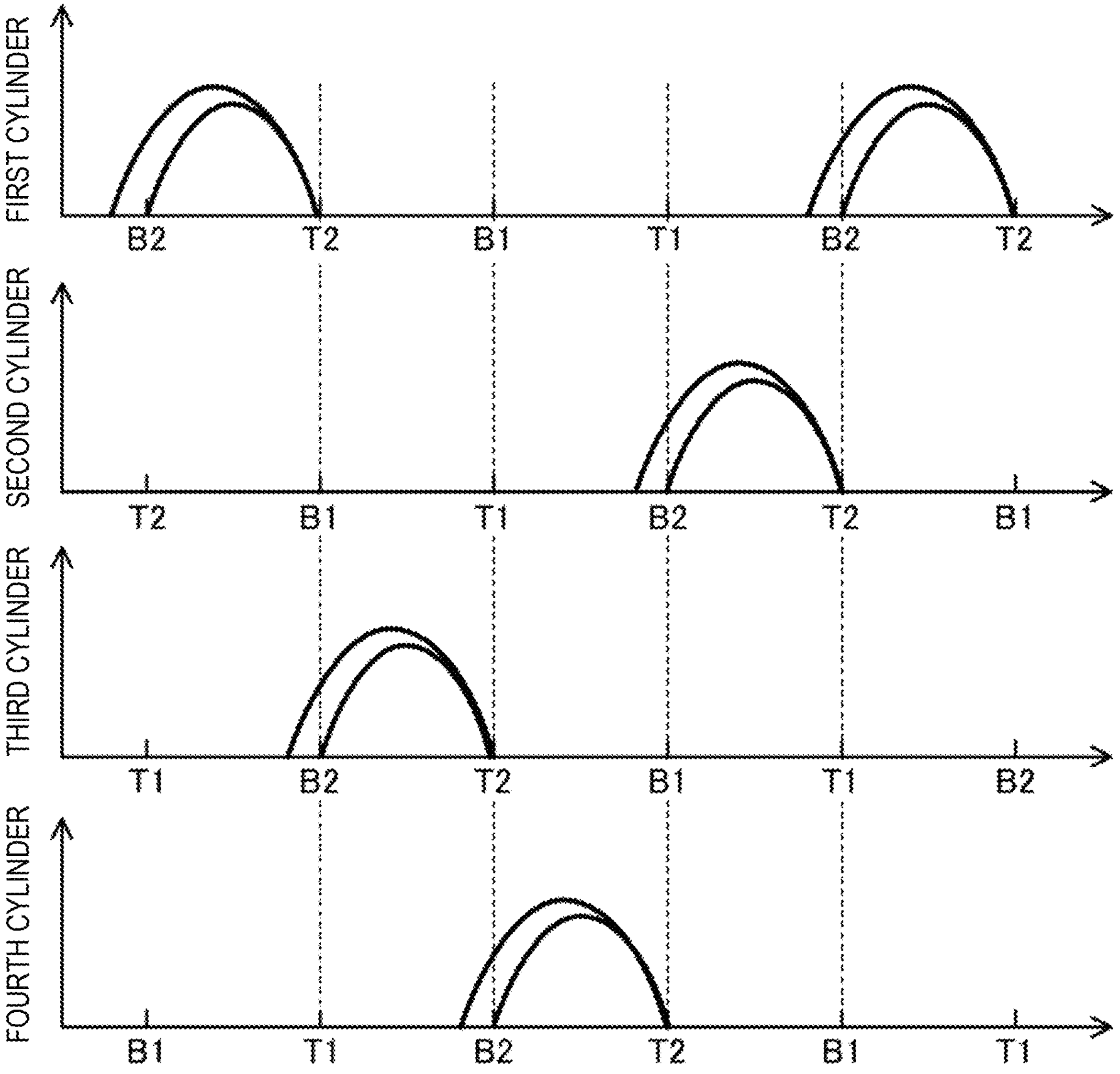
FIG. 7 is a diagram illustrating open-close actions of the exhaust valves in third exhaust valve control.

FIG. 5, FIG. 6, and FIG. 7 illustrate examples of the valve opening periods of the first exhaust valves 23 and the second exhaust valves 24. FIG. 5 illustrates control in a case where the engine 10 is in the cold state and the operation state of the engine 10 belongs to the first operation region 411 (hereinafter, referred to as a first mode). FIG. 6 illustrates control in a case where the engine 10 is in the warm state and the operation state of the engine 10 belongs to the first operation region 411 (hereinafter, referred to as a second mode). FIG. 7 illustrates control in a case where the operation state of the engine 10 belongs to the second operation region 412 (hereinafter, referred to as a third mode). In the present embodiment, whether the engine 10 is in the cold state or in the warm state is determined based on the temperature of the main exhaust catalyst 60 (a detection result of the main exhaust catalyst temperature sensor SW7). For example, a state where the temperature of the main exhaust catalyst 60 is lower than 300° C. may be the cold state, and a state where the temperature is 300° C. or higher may be the warm state.

FIG. 5, FIG. 6, and FIG. 7 illustrate the valve opening periods of the first exhaust valves 23 and the second exhaust valves 24 of, from the top, the first cylinder 11*a*, the second cylinder 11*b*, the third cylinder 11*c*, and the fourth cylinder 11*d*. In each of FIG. 5, FIG. 6, and FIG. 7, “B1” denotes a timing of a bottom dead center in the intake stroke, “T1” denotes a timing of a top dead center in the compression stroke, “B2” denotes a timing of the bottom dead center in the expansion stroke, and “T2” denotes a timing of the top dead center in the exhaust stroke. In the following description, "B1" will be referred to as an intake bottom dead center, "T1" will be referred to as a compression top dead center, "B2" will be referred to as an expansion bottom dead center, and "T2" will be referred to as an exhaust top dead center.

As illustrated in FIG. 5, in the first mode, only the first exhaust valves 23 open and close. The first exhaust valve 23 opens at a timing after the expansion bottom dead center B2 and before the exhaust top dead center T2 and closes at a timing after the exhaust top dead center T2 and before the intake bottom dead center B1. The valve opening period of the first exhaust valve 23 is set to a period in which the valve opening period of one first exhaust valve 23 does not overlap the valve opening periods of the other first exhaust valves 23. The valve opening period corresponds to 180° of the crank angle, for example. Note that although details will be described later, in the first mode, the valve opening time of the first exhaust valve 23 is retarded compared to that in the second mode.

In the first mode, the first exhaust valve 23 is opened at the timing after the expansion bottom dead center B2, and the exhaust gas at a high temperature thereby flows into the first exhaust passage 51. Because the piston 14 rises after the expansion bottom dead center B2, the exhaust gas is compressed in the cylinder 11. The exhaust gas is compressed, and the temperature of the exhaust gas thereby rises in the cylinder 11. The first exhaust valve 23 is thereafter opened, and the exhaust gas at a high temperature thereby flows into the first exhaust passage 51.

The exhaust gas at a high temperature flows into the first exhaust passage 51, and the auxiliary exhaust catalyst 61 can thereby efficiently be warmed up.

In the first mode, the first exhaust valves 23 are set as described above, and the exhaust interference in the first joining passage 51*a* and the second joining passage 51*b* is thereby inhibited. For example, in the first joining passage 51*a*, the first exhaust port 21 of the first cylinder 11*a* and the first exhaust port 21 of the second cylinder 11*b* are joined together. As illustrated in FIG. 5, because at the same time as the first exhaust valve 23 of the second cylinder 11*b* is closed, the first exhaust valve 23 of the first cylinder 11*a* opens, the exhaust gas does not simultaneously flow out from the first cylinder 11*a* and the second cylinder 11*b*. The same applies to the second joining passage 51*b*.

As illustrated in FIG. 6, in the second mode, only the first exhaust valves 23 open and close. In the second mode, the valve opening time of the first exhaust valve 23 is a timing close to the expansion bottom dead center B2 compared to that in the first mode. In other words, in the second mode, the valve opening time of the first exhaust valve 23 is advanced compared to that in the first mode. Specifically, in the second mode, the first exhaust valve 23 opens at a timing of the expansion bottom dead center B2 and closes at a timing of the exhaust top dead center T2. Because the first exhaust valve 23 opens at the timing of the expansion bottom dead center B2, the valve opening period of the first exhaust valve 23 includes the expansion bottom dead center B2. The valve opening period of the first exhaust valve 23 is set to a period in which the valve opening period of one first exhaust valve 23 does not overlap the valve opening periods of the other first exhaust valves 23. The valve opening period corresponds to 180° of the crank angle, for example. Note that the valve opening time of the first exhaust valve 23 does not have to strictly match the timing at which the piston 14 is positioned at the bottom dead center and may slightly be deviated from the timing at which the piston 14 is positioned at the bottom dead center.

In the second mode, the first exhaust valve 23 is opened at the timing of the expansion bottom dead center B2, and the exhaust gas at a lower temperature than that in the first mode flows into the first exhaust passage 51. That is, based on the theory of adiabatic expansion (adiabatic compression), because in a state where the first exhaust valve 23 and the second exhaust valve 24 are closed, the pressure of the exhaust gas in the cylinder 11 becomes lowest at the timing of the expansion bottom dead center B2, the temperature of the exhaust gas in the cylinder 11 becomes lowest at the timing of the expansion bottom dead center B2. Thus, the first exhaust valve 23 is opened at the timing of the expansion bottom dead center B2, and the exhaust gas at a temperature which is as low as possible can thereby be caused to flow into the first exhaust passage 51. The exhaust gas at a high temperature is inhibited from flowing into the first exhaust passage 51, and thermal degradation of the auxiliary exhaust catalyst 61 can thereby be inhibited.

In the second mode also, the first exhaust valves 23 are set as described above, and similarly to a case of the first mode, the exhaust interference in the first joining passage 51*a* and the second joining passage 51*b* is thereby inhibited.

As illustrated in FIG. 7, in the third mode, both of the first exhaust valve 23 and the second exhaust valve 24 open and close. Specifically, the first exhaust valve 23 opens at the timing of the expansion bottom dead center B2 and closes at the timing of the exhaust top dead center T2. The valve opening period of the first exhaust valve 23 is set to a period in which the valve opening period of one first exhaust valve 23 does not overlap the valve opening periods of the other first exhaust valves 23. The valve opening period of the first exhaust valve 23 corresponds to 180° of the crank angle, for example. Note that the valve opening time of the first exhaust valve 23 does not have to strictly match the timing at which the piston 14 is positioned at the bottom dead center and may slightly be deviated from the timing at which the piston 14 is positioned at the bottom dead center.

Meanwhile, the valve opening time of the second exhaust valve 24 is advanced relatively to that of the first exhaust valve 23. In other words, the valve opening time of the first exhaust valve 23 is retarded relatively to the valve opening time of the second exhaust valve 24. The valve opening time of the second exhaust valve 24 is a timing before the expansion bottom dead center B2. Specifically, the second exhaust valve 24 opens at a timing after the compression top dead center T1 and before the expansion bottom dead center B2 and closes at the timing of the exhaust top dead center T2. The valve opening period of the second exhaust valve 24 is longer than the valve opening period of the first exhaust valve 23. Thus, the valve opening period of one second exhaust valve 24 overlaps the valve opening period of the other second exhaust valve 24. Because the third joining passage 52*c* joins together the first exhaust ports 21 of the cylinders 11 between which the exhaust strokes are not consecutively performed, even when the valve opening periods of the second exhaust valves 24 are set as described above, the exhaust interference does not occur in the third joining passage 52*c*.

In the third mode, the second exhaust valve 24 is opened at the timing before the expansion bottom dead center B2, and the exhaust gas at a high temperature thereby flows into the second exhaust passage 52. At a timing before the expansion bottom dead center B2, the exhaust gas is in a more compressed state than at the expansion bottom dead center B2 and is in a state where a heat dissipation amount to the engine 10 is small. Thus, the second exhaust valve 24 is opened, and the exhaust gas at a high temperature thereby flows into the second exhaust passage 52.

The exhaust gas at a high temperature flows into the second exhaust passage 52, and the main exhaust catalyst 60 can thereby efficiently be warmed up.

In the third mode, the valve opening time of the first exhaust valve 23 is retarded relatively to the valve opening time of the second exhaust valve 24, particularly, is set to the timing of the expansion bottom dead center B2, and the exhaust gas at a comparatively low temperature flows into the first exhaust passage 51. After the second exhaust valve 24 is opened, the pressure in the cylinder 11 is lowered. Further, the exhaust gas is in a state where heat is dissipated to the engine 10. Thus, the temperature of the exhaust gas to flow into the first exhaust passage 51 becomes low.

The exhaust gas at a comparatively low temperature flows into the first exhaust passage 51, and thermal degradation of the auxiliary exhaust catalyst 61 can thereby be inhibited.

Figure 8:
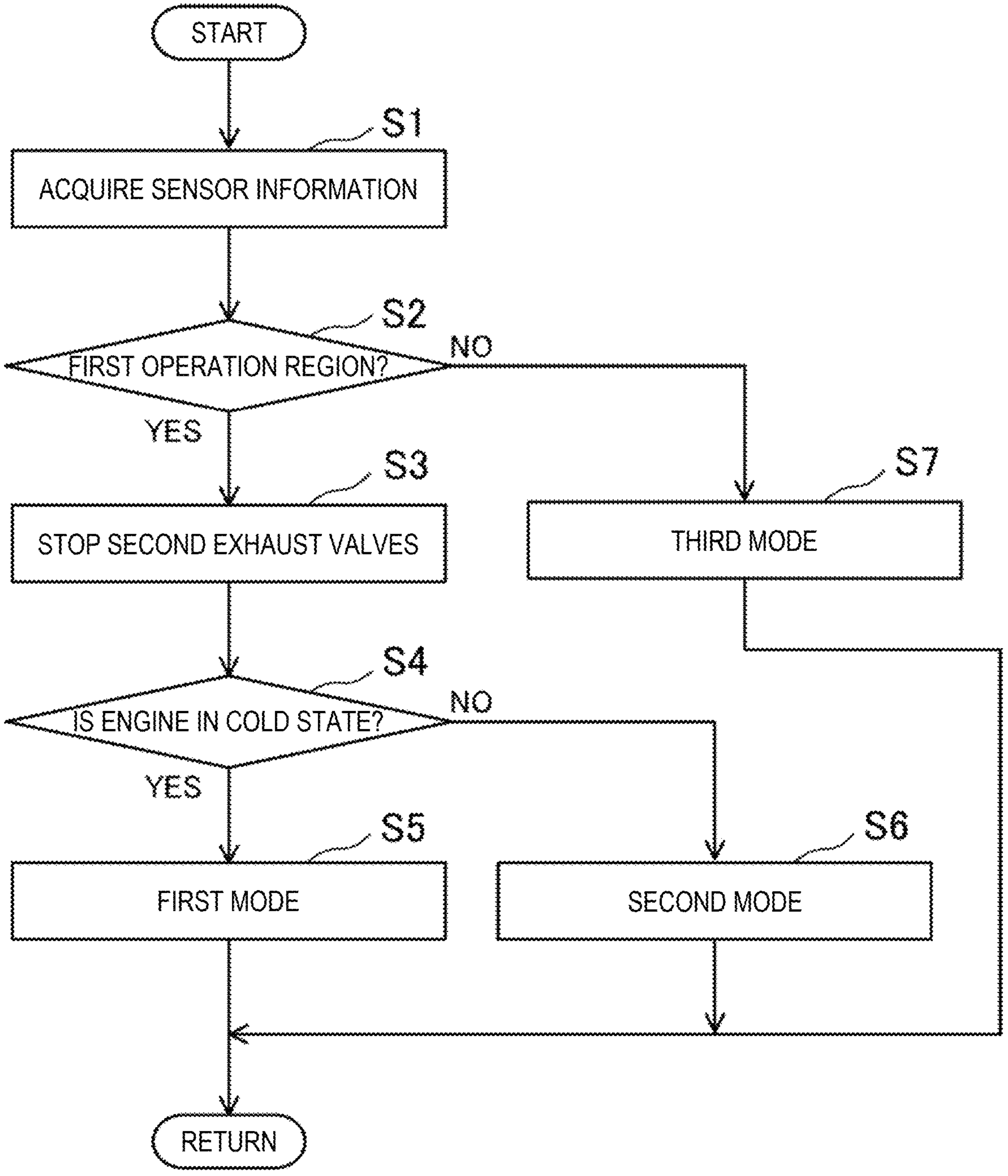
FIG. 8 is a flowchart illustrating, as an example, the open-close control of the exhaust valves, which is executed by an ECU.

Next, with reference to FIG. 8, a description will be made about a process by the ECU 100 in a case where the exhaust system 1 is controlled.

First, in step S1, the ECU 100 acquires information of each of the sensors SW1 to SW8.

Next, in step S2, the ECU 100 determines whether or not the operation state of the engine 10 belongs to the first operation region 411. In a case of YES where the operation state of the engine 10 belongs to the first operation region 411, the ECU 100 moves to step S3. On the other hand, in a case of NO where the operation state of the engine 10 belongs to the second operation region 412, the ECU 100 moves to step S7.

In the step S3, the ECU 100 actuates the valve stopping mechanisms of the HLAs 242 and thereby stops the open-close actions of the second exhaust valves 24.

In next step S4, the ECU 100 determines whether or not the engine is in the cold state. The ECU 100 determines whether or not the engine 10 is in the cold state based on the temperature of the main exhaust catalyst 60. In a case of YES where the engine 10 is in the cold state, the ECU 100 moves to step S5. On the other hand, in a case of NO where the engine 10 is in the warm state, the ECU 100 moves to step S6.

In the step S5, the ECU 100 controls the first exhaust valves 23 in the first mode. The ECU 100 opens each of the first exhaust valves 23 after the expansion bottom dead center and before the exhaust top dead center and closes each of the first exhaust valves 23 after the exhaust top dead center and before the intake bottom dead center. After step S5, the process returns.

In the step S6, the ECU 100 controls the first exhaust valves 23 in the second mode. The ECU 100 opens each of the first exhaust valves 23 at the expansion bottom dead center and closes each of the first exhaust valves 23 at the exhaust top dead center. After step S6, the process returns.

In the step S7, the ECU 100 controls the first exhaust valves 23 and the second exhaust valves 24 in the third mode. The ECU 100 opens each of the first exhaust valves 23 at the expansion bottom dead center and closes each of the first exhaust valves 23 at the exhaust top dead center. Further, the ECU 100 opens each of the second exhaust valves 24 after the compression top dead center and before the expansion bottom dead center and closes each of the second exhaust valves 24 at the exhaust top dead center. After step S11, the process returns.

(5) EFFECTS OF EMBODIMENT

In the exhaust system 1 according to the present embodiment, the exhaust passage 50 includes the first exhaust passage 51 which is opened and closed by the first exhaust valves 23, the second exhaust passage 52 which causes the exhaust gas to flow independently from the first exhaust passage 51 and which is opened and closed by the second exhaust valves 24, and the third exhaust passage in which the first exhaust passage 51 and the second exhaust passage 52 merge together, and the exhaust catalysts include the main exhaust catalyst 60 which is provided in the third exhaust passage 53 and the auxiliary exhaust catalyst 61 which is arranged in the first exhaust passage 51 and has a smaller capacity than that of the main exhaust catalyst 60. The exhaust system 1 has the first exhaust passage 51 and the second exhaust passage 52 which can cause the exhaust gas to flow independently from each other, and the auxiliary exhaust catalyst 61 is provided only in the first exhaust passage 51. Thus, when the flow amount of the exhaust gas is large, the flow amount of the exhaust gas in the first exhaust passage 51 is made smaller than the flow amount of the exhaust gas in the second exhaust passage 52, and the exhaust system 1 can thereby inhibit a large amount of exhaust gas from passing through the auxiliary exhaust catalyst 61. The exhaust system 1 can inhibit thermal degradation of the auxiliary exhaust catalyst 61.

Further, the second exhaust passage 52 does not have the auxiliary exhaust catalyst 61. Thus, the exhaust gas flowing through the second exhaust passage 52 is, without any change, introduced into the third exhaust passage 53 and passes through the main exhaust catalyst 60. In the exhaust system 1, when an exhaust gas amount is large, the exhaust gas is caused to flow through the second exhaust passage 52, and the main exhaust catalyst 60 can thereby efficiently be warmed up.

In the present embodiment, the second exhaust passage 52 has the ejector 57. Because the exhaust system 1 can cause the exhaust gas in the second exhaust passage 52 to flow as early as possible by the ejector 57, the exhaust interference in the second exhaust passage 52 can be inhibited.

In the present embodiment, when the operation state of the engine 10 belongs to the first operation region 411 in which the engine load is smaller than the predetermined load and the engine speed is lower than the predetermined revolution speed, the ECU 100 actuates the HLAs 242 so as to stop the flow of the exhaust gas from the second exhaust passage 52 to the third exhaust passage 53. When the operation state of the engine 10 is in the first operation region 411, because the exhaust gas amount is comparatively small, the exhaust gas is caused to flow only through the first exhaust passage 51. Accordingly, the exhaust system 1 can efficiently warm up the auxiliary exhaust catalyst 61 even when the exhaust gas amount is small.

Further, in the exhaust system 1, because the exhaust gas flows only through the first exhaust passage 51, the exhaust gas is supplied only to the first scroll portion 58*a* of the turbine housing 58. Accordingly, an exhaust gas pressure in the first scroll portion 58*a* becomes high, and the turbine 72 can thereby efficiently be rotated. The exhaust system 1 can improve operation efficiency of the engine 10.

In the present embodiment, when the operation state of the engine 10 belongs to the first operation region 411 and the engine 10 is in the cold state, the ECU 100 makes the valve opening time of the first exhaust valve 23 be retarded, compared to a case where the operation state of the engine 10 belongs to the first operation region 411 and the engine 10 is in the warm state, and be later than the expansion bottom dead center.

Accordingly, the exhaust gas at a high temperature which is compressed in the combustion chamber 17 flows into the first exhaust passage 51. The exhaust system 1 can cause the exhaust gas at a high temperature to pass through the auxiliary exhaust catalyst 61. The exhaust system 1 can efficiently warm up the auxiliary exhaust catalyst 61.

In the present embodiment, when the operation state of the engine 10 belongs to the first operation region 411 and the engine 10 is in the warm state, the ECU 100 sets the valve opening period of the first exhaust valve 23 to a period which includes the expansion bottom dead center. Accordingly, when the engine 10 is in the warm state, the exhaust gas at a temperature, which is as low as possible, flows into the first exhaust passage 51. The exhaust system 1 can inhibit thermal degradation of the auxiliary exhaust catalyst 61.

In particular, in the present embodiment, when the operation state of the engine 10 belongs to the first operation region 411 and the engine 10 is in the warm state, the ECU 100 sets the valve opening time of the first exhaust valve 23 to the timing of the expansion bottom dead center. Accordingly, when the engine 10 is in the warm state, the exhaust gas, which is maximally expanded in the combustion chamber 17 and whose temperature is lowered, flows into the first exhaust passage 51. The exhaust system 1 can inhibit thermal degradation of the auxiliary exhaust catalyst 61.

In the present embodiment, when the operation state of the engine 10 belongs to the second operation region 412 in which the engine load is equal to or smaller than the predetermined load and the engine speed is equal to or lower than the predetermined revolution speed, the ECU 100 retards the valve opening time of the first exhaust valve 23 relatively to the valve opening time of the second exhaust valve 24. The second exhaust valve 24 is opened earlier than the first exhaust valve 23, the exhaust gas at a comparatively high temperature thereby flows into the second exhaust passage 52, and the exhaust gas at a comparatively low temperature flows into the first exhaust passage 51. Accordingly, the exhaust system 1 can efficiently warm up the main exhaust catalyst 60 and can inhibit thermal degradation of the auxiliary exhaust catalyst 61.

Further, in the present embodiment, when the operation state of the engine 10 belongs to the second operation region 412, the ECU 100 makes the valve opening period of a second exhaust valve 23 be longer than the valve opening period of a first exhaust valve 21. The exhaust system 1 causes the exhaust gas to flow into the second exhaust passage 52 as much as possible and can thereby decrease the flow amount of the exhaust gas in the first exhaust passage 51. Accordingly, the exhaust system 1 can inhibit thermal degradation of the auxiliary exhaust catalyst 61.

Further, in the present embodiment, when the operation state of the engine 10 belongs to the second operation region 412, the ECU 100 opens the second exhaust valve 24 after the compression top dead center and before the expansion bottom dead center. Before the expansion bottom dead center, the exhaust gas is in a more compressed state than at the expansion bottom dead center, is in a state where the heat dissipation amount to the engine 10 is small, and is thus in a state where the temperature is high. The exhaust system 1 can cause as large amount as possible of the exhaust gas at a comparatively high temperature to flow into the second exhaust passage 52. On the other hand, only as small amount as possible of the exhaust gas at a comparatively low temperature can be caused to flow into the first exhaust passage 51. Accordingly, the exhaust system 1 can efficiently warm up the main exhaust catalyst 60 and can inhibit thermal degradation of the auxiliary exhaust catalyst 61.

Further, in the present embodiment, when the operation state of the engine 10 belongs to the second operation region 412, the ECU 100 causes the first exhaust valve 23 to be opened at the timing of the expansion bottom dead center. Accordingly, when the operation state of the engine 10 belongs to the second operation region 412, the exhaust gas, which is maximally expanded in the combustion chamber 17 and whose temperature is lowered, flows into the first exhaust passage 51. The exhaust system 1 can inhibit thermal degradation of the auxiliary exhaust catalyst 61.

In the present embodiment, between the first exhaust passage 51 and second exhaust passage 52 and the third exhaust passage 53, the turbine housing 58 is arranged in which the turbine 72 of the twin scroll turbocharger is arranged, and the first exhaust passage 51 and the second exhaust passage 52 are joined together in the turbine housing 58. Accordingly, the exhaust system 1 can inhibit the exhaust interference between the exhaust gas flowing through the first exhaust passage 51 and the exhaust gas flowing through the second exhaust passage 52.

In the present embodiment, the first exhaust passage 51 has the first joining passage **51*a* and the second joining passage 51*b*, each of which connects together one pair of first exhaust ports 21 being adjacent in the straight-line direction in which the cylinders 11 are aligned, and the first collection passage 51*c* in which the first joining passage 51*a* and the second joining passage 51*b* are joined together. Accordingly, in the exhaust system 1, compared to a case where the first exhaust passage 51 is formed as an independent passage for each of the cylinders 11, a configuration of the first exhaust passage 51 can be made compact. Further, in the present embodiment, the ECU 100 sets the valve opening period of the first exhaust valve 23 to the period in which the valve opening period of one first exhaust valve 23 does not overlap the valve opening periods of the other first exhaust valves 23. Thus, even when each of the first joining passage 51*a* and the second joining passage 51*b* connects together the cylinders 11 between which the exhaust strokes are consecutively performed, the exhaust system 1 can inhibit the exhaust interference in the first joining passage 51*a* and the second joining passage 51*b***.

In the present embodiment, the second exhaust passage 52 has the third joining passage **52*c* that connects together the second exhaust ports 22, which are adjacent in the straight-line direction, in which the cylinders 11 are aligned, and between which the exhaust strokes are not consecutively performed. Accordingly, in the exhaust system 1, compared to a case where the second exhaust passage 52 is formed as an independent passage for each of the cylinders 11, a configuration of the second exhaust passage 52** can be made compact.

MODIFICATION

Figure 9:
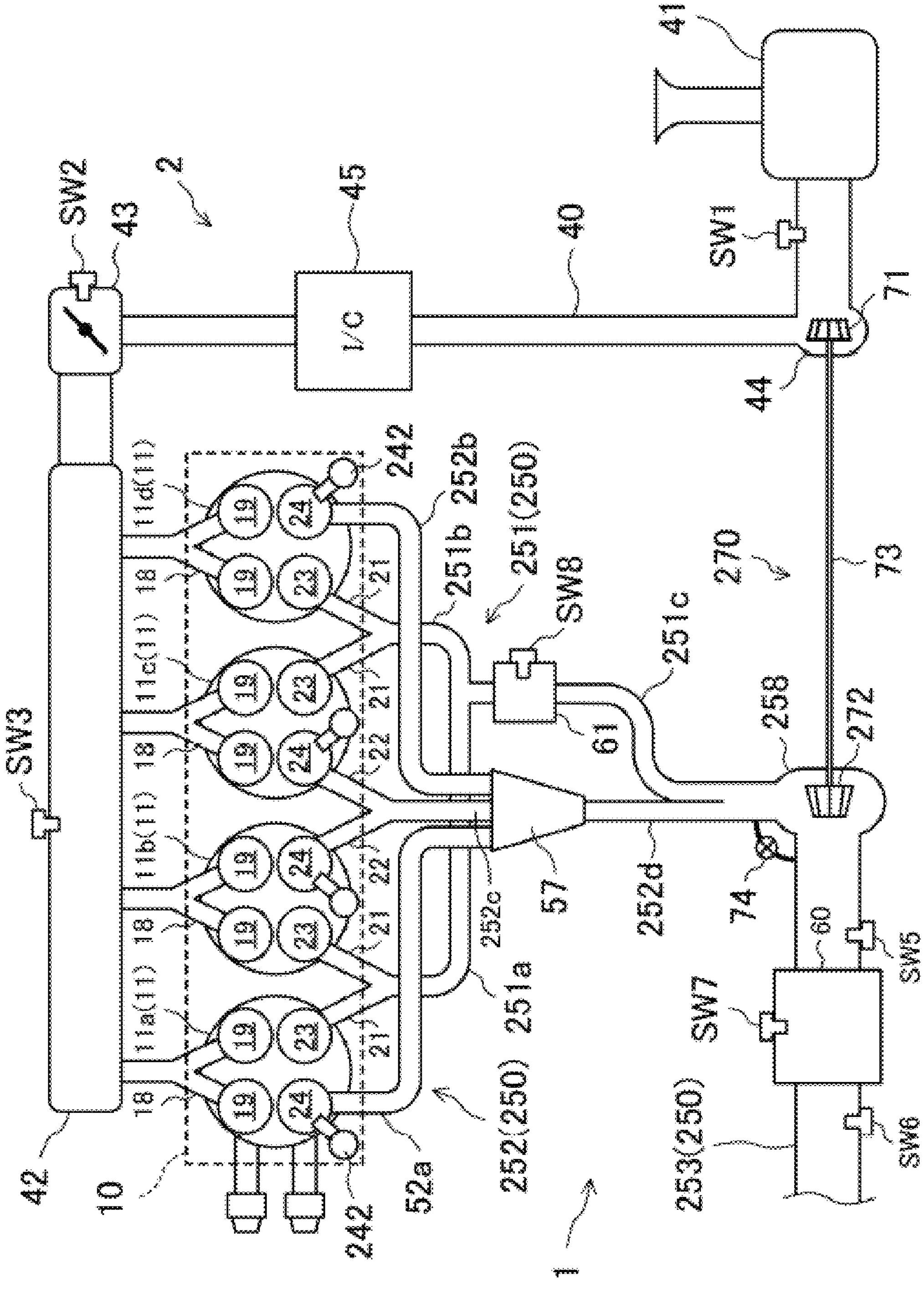
FIG. 9 is an outline diagram illustrating an engine system having an exhaust system according to a modification.

FIG. 9 illustrates a modification of the above-described embodiment. The modification is different from the above-described embodiment in configurations of the exhaust passage 50 and a turbocharger 270. Specifically, in the modification, the turbocharger 270 is not the twin scroll turbocharger but is a turbocharger which has only one scroll portion. The exhaust passage 50 is different from the embodiment in a configuration around a turbine housing 258 in which a turbine 272 of the turbocharger 270 is arranged.

As illustrated in FIG. 9, an exhaust passage 250 of an exhaust system 201 includes a first exhaust passage 251, a second exhaust passage 252, and a third exhaust passage 253.

The first exhaust passage 251 has a first joining passage 251*a*, a second joining passage 251*b*, and a first collection passage 251*c*. Because configurations of the first joining passage 251*a* and the second joining passage 251*b* are the same as those of the embodiment, descriptions thereof will not be made.

The second exhaust passage 252 has a first independent passage 252*a*, a second independent passage 252*b*, a third joining passage 252*c*, and a second collection passage 252*d*. Because configurations of the first independent passage 252*a*, the second independent passage 252*b*, and the third joining passage 252*c* are the same as those of the embodiment, descriptions thereof will not be made.

The third exhaust passage 253 extends to an upstream side relative to the turbine housing 258. In other words, this is a state where the turbine housing 258 is arranged in a halfway portion of the third exhaust passage 253. The wastegate valve 74 is provided in a passage which connects a portion in the third exhaust passage 253 on the upstream side relative to the turbine housing 258 with a portion in the third exhaust passage 253 on a downstream side relative to the turbine housing 258.

The first collection passage 251*c* and the second collection passage 252*d* are connected with the third exhaust passage 253 on the upstream side relative to the turbine housing 258. The first collection passage 251*c* and the second collection passage 252*d* extend in parallel with each other in a connection portion to the third exhaust passage 253. Specifically, in the connection portion to the third exhaust passage 253, the first collection passage 251*c* and the second collection passage 252*d* extend such that a flow of the exhaust gas flowing through the first collection passage 251*c* and a flow of the exhaust gas flowing through the second collection passage 252*d* are in the same direction.

The exhaust system 201 according to the present modification also causes the exhaust gas to flow, mutually independently, through the first exhaust passage 251 and the second exhaust passage 252. Further, the auxiliary exhaust catalyst 61 is arranged only in the first exhaust passage 251. Thus, the exhaust system 201 according to the present modification can also inhibit thermal degradation of the auxiliary exhaust catalyst 61.

Further, in the exhaust system 201 according to the present modification, the first exhaust passage 251 and the second exhaust passage 252 are joined together so as to be parallel with each other on the upstream side relative to the turbine housing 258 in which the turbine 272 is arranged. The exhaust system 201 can inhibit a flow of the exhaust gas flowing into the turbine housing 258 from deteriorating due to the exhaust interference between the exhaust gas flowing through the first exhaust passage 51 and the exhaust gas flowing through the second exhaust passage 52.

(8) OTHER EMBODIMENTS

The technique disclosed herein is not limited to the above-described embodiment and can be substituted without departing from the gist of the scope of the claims.

For example, in the above-described embodiment, the turbocharger 70 or 270 is provided, but the turbocharger 70 and 270 are not required configurations and may be omitted.

In the above-described embodiment, when the operation state of the engine 10 belongs to the first operation region 411, the open-close actions of the second exhaust valves 24 are stopped by the HLAs 242, and the flow of the exhaust gas from the second exhaust passage 52 to the third exhaust passage 53 is thereby stopped. This is not restrictive, an exhaust shutter valve is provided in each of the second collection passage 52*d* and 252*d*, and the flow of the exhaust gas from the second exhaust passage 52 to the third exhaust passage 53 may thereby be stopped. That is, when the operation state of the engine 10 belongs to the first operation region 411, the exhaust shutter valve may be closed.

In first and second embodiments, the first exhaust valve 23 and the second exhaust valve 24 have the same size. This is not restrictive, and the first exhaust valve 23 and the second exhaust valve 24 may have different sizes. For example, in a case where an output of the engine 10 is desired to be made high in the second operation region 412, the first exhaust valve 23 may be made larger than the second exhaust valve 24. Further, in a case where it is desired to actively lower the temperature of the exhaust gas flowing through the first exhaust passage 51 in the second operation region 412, the second exhaust valve 24 may be made larger than the first exhaust valve 23.

In the above-described embodiment, in the second mode, the valve opening time of the first exhaust valve 23 is the timing of the expansion bottom dead center B2. This is not restrictive, and the valve opening time of the first exhaust valve 23 may be earlier than the expansion bottom dead center B2. Further, in the second mode, the valve opening period of the first exhaust valve 23 may correspond to an angle which is slightly larger than 180° (approximately 200°). When the operation state of the engine 10 belongs to the first operation region 411, the flow amount (volume) of the exhaust gas is small. Further, when the valve opening period of the first exhaust valve 23 corresponds to an angle larger than 180°, the first exhaust valve 23 opens in the expansion stroke. Thus, the exhaust gas is not all at once discharged to the first exhaust passage 51. Even when as in the embodiment, the first exhaust passage 51 connects together the cylinders 11 between which the exhaust strokes are consecutively performed, the exhaust interference is not likely to occur.

The above-described embodiments are only examples, and the scope of the present disclosure should not restrictively be interpreted. The scope of the present disclosure is defined by the claims, and all modifications and changes belonging to the equivalent scope of the claims are included in the scope of the present disclosure.

INDUSTRIAL APPLICABILITY

The technique disclosed herein is useful as an exhaust system.

REFERENCE SIGNS LIST

1 exhaust system
10 engine
17 combustion chamber
23 first exhaust valve
24 second exhaust valve
40 intake passage
50 exhaust passage
51 first exhaust passage
52 second exhaust passage
53 third exhaust passage
57 ejector
58 turbine housing
60 main exhaust catalyst
61 auxiliary exhaust catalyst
70 turbocharger
72 turbine

100 ECU (controller)
242 hydraulic lash adjuster (flow amount adjustment unit)
250 exhaust passage
251 first exhaust passage
252 second exhaust passage
253 third exhaust passage
258 turbine housing
270 turbocharger
272 turbine
411 first operation region
412 second operation region

The invention claimed is:

1. An exhaust system comprising:

an exhaust passage through which exhaust gas flows;

a first exhaust valve and a second exhaust valve; each of the first exhaust valve and the second exhaust valve opens and closes a portion between a combustion chamber of an engine and the exhaust passage; and a plurality of exhaust catalysts provided in the exhaust passage to purify the exhaust gas, wherein the exhaust passage includes:

a first exhaust passage which is opened and closed by the first exhaust valve;

a second exhaust passage through which the exhaust gas is caused to flow independently from the first exhaust passage, the second exhaust passage being opened and closed by the second exhaust valve; and a third exhaust passage in which the first exhaust passage and the second exhaust passage merge together, the plurality of exhaust catalysts include:

a main exhaust catalyst provided in the third exhaust passage; and an auxiliary exhaust catalyst arranged in the first exhaust passage, the auxiliary exhaust catalyst having a smaller capacity than the main exhaust catalyst, the exhaust system further comprises:

a hydraulic lash adjuster which adjusts a flow amount of the exhaust gas from the second exhaust passage to the third exhaust passage, the hydraulic lash adjuster including a valve stopping mechanism for stopping an action of the second exhaust valve; and a controller having a processor and a memory with a computer readable program stored therein that upon execution of the computer readable program by the processor configures the controller to actuate the hydraulic lash adjuster, and when an operation state of the engine belongs to a first operation region in which an engine load is smaller than a predetermined load and an engine speed is lower than a predetermined revolution speed, the controller actuates the hydraulic lash adjuster so as to stop a flow of the exhaust gas from the second exhaust passage to the third exhaust passage.

2. The exhaust system according to claim 1, wherein the second exhaust passage has an ejector, the ejector including:

a diffuser portion having a first cross-sectional area; and a nozzle portion having a second cross-sectional area, the second cross-sectional area being smaller than the first cross-sectional area, and the diffuser portion is upstream of the nozzle portion.

3. The exhaust system according to claim 2, further comprising:

a turbocharger having a turbine arranged in a turbine housing, wherein the turbine housing is arranged in a portion in the third exhaust passage on an upstream side relative to the main exhaust catalyst.

4. The exhaust system according to claim 3, wherein the turbocharger is a twin scroll turbocharger including a first scroll portion and a second scroll portion, the first scroll portion being independent from the second scroll portion, the first scroll portion is connected with the first exhaust passage, and the second scroll portion is connected with the second exhaust passage.

5. The exhaust system according to claim 4, further comprising:

a wastegate valve connected between a first collection passage of the first exhaust passage and the third exhaust passage and between a second collection passage of the second exhaust passage and the third exhaust passage.

6. The exhaust system according to claim 1, wherein when the operation state of the engine belongs to the first operation region and the engine is in a cold state, the controller makes a valve opening time of the first exhaust valve be retarded, compared to a case where the operation state of the engine belongs to the first operation region and the engine is in a warm state, and be later than a timing at which a piston of the engine is positioned at a bottom dead center in an expansion stroke.

7. The exhaust system according to claim 6, wherein when the operation state of the engine belongs to the first operation region and the engine is in the warm state, the controller sets a valve opening period of the first exhaust valve to a period which includes the timing at which the piston of the engine is positioned at the bottom dead center in the expansion stroke.

8. The exhaust system according to claim 1, wherein the controller is configured to actuate the first exhaust valve and the second exhaust valve, and when the operation state of the engine belongs to a second operation region in which the engine load is equal to or greater than the predetermined load and the engine speed is equal to or higher than the predetermined revolution speed, the controller retards a valve opening time of the first exhaust valve relatively to a valve opening time of the second exhaust valve.

9. The exhaust system according to claim 8, wherein when the operation state of the engine belongs to the second operation region, the controller makes the valve opening period of the second exhaust valve be longer than the valve opening period of the first exhaust valve.

10. The exhaust system according to claim 9, wherein when the operation state of the engine belongs to the second operation region, the controller makes the valve opening time of the second exhaust valve be earlier than a timing at which a piston of the engine is positioned at a bottom dead center in an expansion stroke.

11. The exhaust system according to claim 10, further comprising:

a turbocharger having a turbine arranged in a turbine housing, wherein the turbine housing is arranged in a portion in the third exhaust passage on an upstream side relative to the main exhaust catalyst.

12. The exhaust system according to claim 11, wherein the turbocharger is a twin scroll turbocharger including a first scroll portion and a second scroll portion, the first scroll portion being independent from the second scroll portion, the first scroll portion is connected with the first exhaust passage, and the second scroll portion is connected with the second exhaust passage.

13. The exhaust system according to claim 1, wherein when the operation state of the engine belongs to the second operation region, the controller makes the valve opening period of the second exhaust valve be longer than the valve opening period of the first exhaust valve.

14. An exhaust system comprising:

an exhaust passage through which exhaust gas flows;

a first exhaust valve and a second exhaust valve; each of the first exhaust valve and the second exhaust valve opens and closes a portion between a combustion chamber of an engine and the exhaust passage;

a plurality of exhaust catalysts provided in the exhaust passage to purify the exhaust gas; and a turbocharger having a turbine arranged in a turbine housing, wherein the exhaust passage includes:

a first exhaust passage which is opened and closed by the first exhaust valve and the first exhaust passage is connected to the turbocharger;

a second exhaust passage through which the exhaust gas is caused to flow independently from the first exhaust passage, the second exhaust passage being opened and closed by the second exhaust valve, the second exhaust passage being connected to the turbocharger; and a third exhaust passage in which the first exhaust passage and the second exhaust passage merge together and the third exhaust passage is connected to the turbocharger, the plurality of exhaust catalysts include:

a main exhaust catalyst provided in the third exhaust passage; and an auxiliary exhaust catalyst arranged in the first exhaust passage, the auxiliary exhaust catalyst having a smaller capacity than the main exhaust catalyst, and the turbine housing is arranged in a portion in the third exhaust passage on an upstream side relative to the main exhaust catalyst, the exhaust system further comprises:

a controller having a processor and a memory with a computer readable program stored therein that upon execution of the computer readable program by the processor configures the controller to actuate the first exhaust valve and the second exhaust valve, and when an operation state of the engine belongs to a second operation region in which an engine load is equal to or greater than a predetermined load and an engine speed is equal to or higher than a predetermined revolution speed, the controller retards a valve opening time of the first exhaust valve relatively to a valve opening time of the second exhaust valve.

15. The exhaust system according to claim 14, wherein the turbocharger is a twin scroll turbocharger including a first scroll portion and a second scroll portion, the first scroll portion being independent from the second scroll portion, the first scroll portion is connected with the first exhaust passage, and the second scroll portion is connected with the second exhaust passage.

16. The exhaust system according to claim 14, wherein the second exhaust passage has an ejector, the ejector including:

a diffuser portion having a first cross-sectional area; and a nozzle portion having a second cross-sectional area, the second cross-sectional area being smaller than the first cross-sectional area, and the diffuser portion is upstream of the nozzle portion.

17. The exhaust system according to claim 14, further comprising:

a hydraulic lash adjuster which adjusts a flow amount of the exhaust gas from the second exhaust passage to the third exhaust passage, the hydraulic lash adjuster including a valve stopping mechanism for stopping an action of the second exhaust valve, wherein the controller is configured to actuate the hydraulic lash adjuster, and when the operation state of the engine belongs to a first operation region in which the engine load is smaller than the predetermined load and the engine speed is lower than the predetermined revolution speed, the controller actuates the hydraulic lash adjuster so as to stop a flow of the exhaust gas from the second exhaust passage to the third exhaust passage.

18. An exhaust system comprising:

an exhaust passage through which exhaust gas flows;

a first exhaust valve and a second exhaust valve; each of the first exhaust valve and the second exhaust valve opens and closes a portion between a combustion chamber of an engine and the exhaust passage;

a plurality of exhaust catalysts provided in the exhaust passage to purify the exhaust gas;

a hydraulic lash adjuster which adjusts a flow amount of the exhaust gas from the second exhaust passage to the third exhaust passage, the hydraulic lash adjuster including a valve stopping mechanism for stopping an action of the second exhaust valve; and a controller having a processor and a memory with a computer readable program stored therein that upon execution of the computer readable program by the processor configures the controller to actuate the hydraulic lash adjuster, wherein the exhaust passage includes:

a first exhaust passage which is opened and closed by the first exhaust valve;

a second exhaust passage through which the exhaust gas is caused to flow independently from the first exhaust passage, the second exhaust passage being opened and closed by the second exhaust valve; and a third exhaust passage in which the first exhaust passage and the second exhaust passage merge together, and the plurality of exhaust catalysts include:

a main exhaust catalyst provided in the third exhaust passage; and an auxiliary exhaust catalyst arranged in the first exhaust passage, the auxiliary exhaust catalyst having a smaller capacity than the main exhaust catalyst.

* * * * *